United States Patent
Deng et al.

(10) Patent No.: US 6,854,557 B1
(45) Date of Patent: Feb. 15, 2005

(54) ANTI-JACKKNIFE CONTROL FOR VEHICLE-TRAILER BACKING UP USING REAR-WHEEL STEER CONTROL

(75) Inventors: Weiwen Deng, Rochester Hills, MI (US); Yong Han Lee, Troy, MI (US)

(73) Assignee: General Motors Corporation, Detroit, MI (US)

(*) Notice: Subject to any disclaimer, the term of this patent is extended or adjusted under 35 U.S.C. 154(b) by 18 days.

(21) Appl. No.: 10/646,618

(22) Filed: Aug. 21, 2003

(51) Int. Cl.[7] .............................. B62D 5/04; B60D 1/30
(52) U.S. Cl. ................... 180/445; 180/235; 180/411; 280/442; 701/41; 340/431
(58) Field of Search ....................... 180/443, 445, 180/235, 408, 411, 419, 418; 340/431; 280/442, 432, 98–99; 701/41–43

(56) References Cited

U.S. PATENT DOCUMENTS

| | | | | |
|---|---|---|---|---|
| 5,001,639 A | * | 3/1991 | Breen .......................... | 701/70 |
| 5,097,250 A | * | 3/1992 | Hernandez .................. | 340/438 |
| 5,247,442 A | * | 9/1993 | Kendall ........................ | 701/41 |
| 5,579,228 A | * | 11/1996 | Kimbrough et al. .......... | 701/41 |
| 5,912,616 A | | 6/1999 | Valentino | |
| 6,268,800 B1 | | 7/2001 | Howard | |
| 6,292,094 B1 | | 9/2001 | Deng et al. | |
| 6,560,524 B2 | | 5/2003 | Lin et al. | |
| 6,640,170 B2 | * | 10/2003 | Klein et al. ................... | 701/41 |
| 6,655,710 B2 | | 12/2003 | Lindell et al. .............. | 280/419 |

* cited by examiner

*Primary Examiner*—Avraham Lerner
(74) *Attorney, Agent, or Firm*—Kathryn A. Marra

(57) ABSTRACT

A vehicle control system that selectively provides rear-wheel steering to prevent a vehicle-trailer from jackknifing during a back-up maneuver. The system senses a steering angle of the vehicle, a speed of the vehicle and a hitch angle between the vehicle and the trailer. The system calculates an equilibrium hitch angle that is a steady-state hitch angle position based on the steering angle and the vehicle speed, and a pseudo-equilibrium hitch angle that is a steady-state hitch angle at a maximum rear-wheel steering input based on the steering angle and the vehicle speed. The system then determines whether the rear-wheel steering should be provided based on a predetermined relationship between the sensed hitch angle, the equilibrium hitch angle and the pseudo-equilibrium hitch angle.

32 Claims, 5 Drawing Sheets

ANTI-JACKKNIFE CONTROL FOR VEHICLE-TRAILER BACKING UP USING REAR-WHEEL STEER CONTROL

BACKGROUND OF THE INVENTION

1. Field of the Invention

This invention relates generally to a control system and method for preventing a vehicle-trailer from jackknifing and, more particularly, to a control system and method that selectively controls rear-wheel steering of a vehicle to assist the vehicle operator when backing up a trailer to prevent a jackknife condition.

2. Discussion of the Related Art

Automotive vehicles that employ coordinated front wheel steering and rear-wheel steering systems are known in the art. Typically in such coordinated vehicle wheel steering systems, the driver controls the steering of the vehicle's front wheels and a computer-based on-board steering controller controls the steering of the vehicle's rear wheels in response thereto. In one example, the computer controlled rear-wheel steering system employs an electric motor driven rack and pinion rear-wheel steering actuator.

Backing up a vehicle-trailer is typically a complex task, and requires a certain level of skill. A jackknife condition may occur when a vehicle-trailer is moving away from its equilibrium position, where the system becomes unstable. In other words, the relative angle between the vehicle and trailer is diverging from the driver's intended target angle, which usually increases if proper steering and/or breaking actions are not taken.

It is known in the art to employ the coordinated front and rear wheel steering system referred to above to assist a driver operating a vehicle pulling a trailer. Particularly, U.S. Pat. No. 6,292,094, issued Sep. 18, 2001 to Deng et al., discloses a vehicle/trailer backing-up control system in connection with a computer controlled rear-wheel steering system. The '094 patent employs an algorithm that uses front wheel angle, vehicle speed, vehicle yaw rate and hitch angle to control the rear-wheel steering angle to assist the operator in backing up the vehicle-trailer. U.S. patent application Ser. No. 10/336,120, filed Jan. 3, 2003, titled "Trailer Tongue Length Estimation Using a Hitch Angle Sensor," is a modification of the '094 patent that provides an estimation of the trailer tongue length to further help the system in the back-up control.

U.S. patent application Ser. No. 10/435,209, filed May 9, 2003, titled "Vehicle Trailer Backing Up Jackknife Detection And Warning System," assigned to the assignee of this application, discloses a jackknife warning system for a vehicle. This jackknife warning system uses vehicle steering angle, vehicle speed and hitch angle to determine a potential jackknife condition. The system warns the driver if the trailer is moving towards a jackknife condition, and provides steering direction assistance.

SUMMARY OF THE INVENTION

In accordance with the teachings of the present invention, a vehicle control system and associated method is disclosed that selectively provides rear-wheel steering to prevent a vehicle-trailer from jackknifing during a back-up maneuver. The system senses a steering angle of the vehicle, a rearward speed of the vehicle and a hitch angle between the vehicle and the trailer. The system calculates an equilibrium hitch angle that is a steady-state hitch angle position based on the steering angle and the vehicle speed. The system also calculates a pseudo-equilibrium hitch angle that is a steady-state hitch angle position at a maximum rear-wheel steering input. The system then determines whether a rear-wheel steering assist should be provided based on a predetermined relationship between the sensed hitch angle, the equilibrium hitch angle and the pseudo-equilibrium hitch angle.

If the predetermined relationship exists, the system provides the rear-wheel steering assist to prevent the vehicle-trailer from jackknifing. If the rear-wheel assist is being provided, the system will periodically determine if the predetermined relationship between the sensed hitch angle, the equilibrium hitch angle and the pseudo-equilibrium hitch angle still exists, and will remove the rear-wheel steering assist when the relationship does not exist. The relationship includes the direction that the sensed hitch angle is moving and the rate at which the sensed hitch angle is moving.

Additional advantages and features of the present invention will become apparent from the following description and appended claims, taken in conjunction with the accompanying drawings.

DETAILED DESCRIPTION OF THE INVENTION

The following discussion of the embodiments of the invention directed to a system and method for selectively assisting a vehicle operator with rear-wheel steering when backing up a vehicle-trailer to prevent a jackknife condition is merely exemplary in nature, and is in no way intended to limit the invention or its applications or uses.

As will be discussed in detail below, the present invention employs computer controlled rear-wheel steering to selectively assist a vehicle operator when backing up a vehicle-trailer. The algorithm of the invention allows the driver to make the back-up maneuver without automatic input from the rear-wheel steering, unless the operator gets into trouble and a jackknife condition is probable without the assistance.

To selectively provide this assist, the present invention defines an equilibrium hitch angle and a pseudo-equilibrium hitch angle that are used to determine when and how to automatically steer the vehicles rear wheels to stabilize the system so that interference from the rear-wheel steering to the operator is minimized. The vehicle-trailer hitch angle is the angle between the longitudinal axis of the vehicle relative to the longitudinal axis of the trailer. The equilibrium hitch angle is the hitch angle when the system is stable, i.e., the hitch angle does not change under the current vehicle speed and steering angle. The pseudo-equilibrium hitch angle is the hitch angle outside of which the system will not be able to recover to prevent the jackknife condition. The equilibrium hitch angles are determined in real-time using sensor inputs from the driver's steering angle and vehicle speed. If the measured hitch angle diverges from the two equilibrium hitch angles, and its absolute value is increasing towards the pseudo-equilibrium hitch angle and the jackknife condition, the algorithm automatically provides rear-wheel steering to help stabilize the motion, thus preventing the jackknife condition without the vehicle operator's input.

Figure 1:
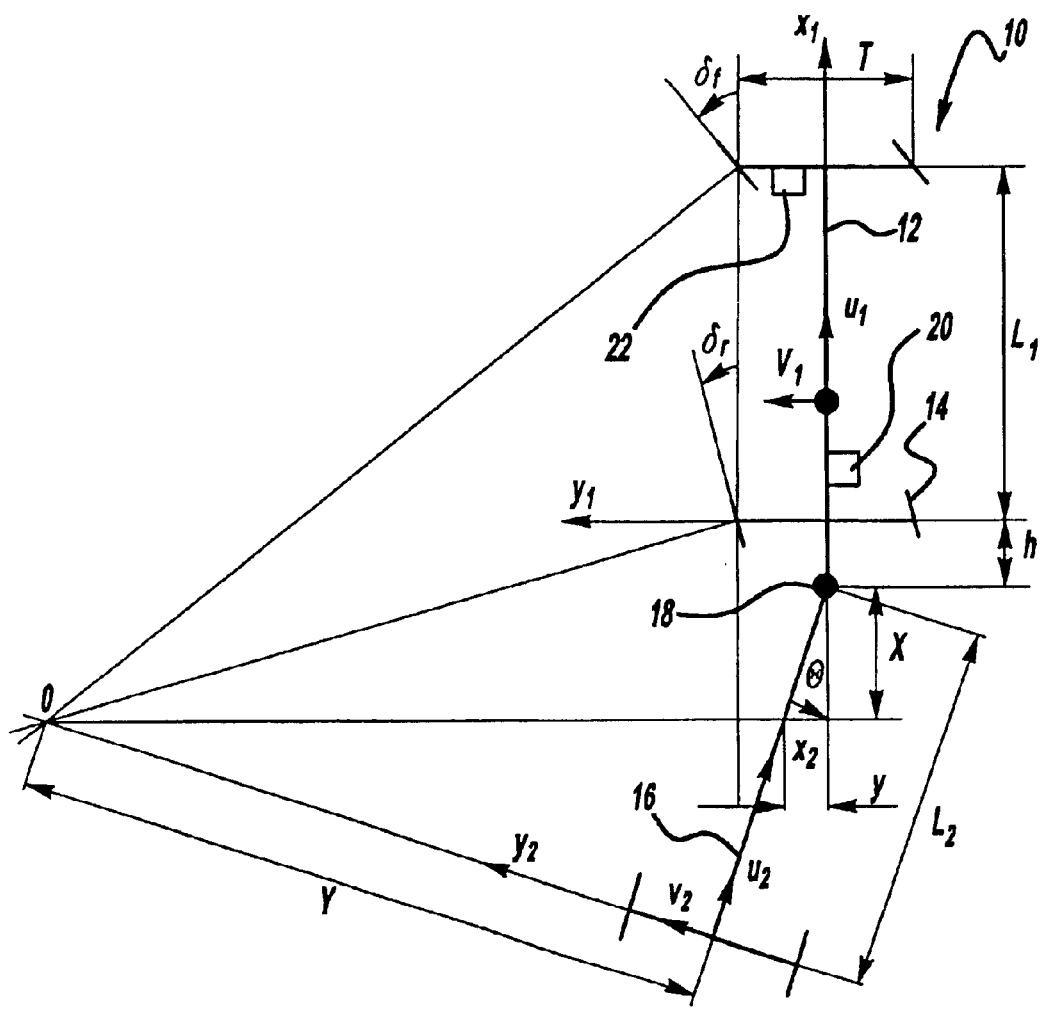
FIG. 1 is a mathematical kinematics model of a vehicle-trailer showing certain variables associated with an algorithm for selectively providing rear-wheel steering, according to the invention.

FIG. 1 is a vehicle-trailer kinematics model 10 including a vehicle 12 having computer controlled steerable rear-wheels 14. A trailer 16 is coupled to the vehicle 12 by a hitch 18. The vehicle 12 includes a speed sensor 20 for determining the speed of the vehicle 12 and a steering angle sensor 22 for determining the steering angle of the vehicle 12. Further, the hitch 18 includes a hitch angle sensor for determining the hitch angle between the vehicle 12 and the trailer 16. The model 10 shows the various variables used by the algorithm of the invention discussed below. The list in Table 1 below also identifies parameters and variables in the model 10 and in the equations below.

TABLE 1

| | |
|---|---|
| $\delta_{sw}$ | Driver steering wheel angle |
| $\theta$ | Measured hitch angle |
| $\bar{\theta}_{eq}$ | Equilibrium hitch angle |
| $\hat{\theta}_{eq}$ | Pseudo equilibrium hitch angle |
| $\delta_f$ | Vehicle front wheel angle |
| $\delta_r$ | Vehicle rear wheel angle |
| $\delta_{r\_max}$ | Maximum rear wheel angle authority |
| $\delta_{r\_cmd}$ | Rear-wheel angle command |
| $\bar{\delta}_{r\_cmd}$ | Stored previous rear-wheel angle command |
| $x_0$ | Origin of x-y coordinate system |
| $x_1$ | Longitudinal axis of vehicle x-y coordinate system |
| $x_2$ | Longitudinal axis of trailer x-y coordinate system |
| $y_1$ | Lateral axis of vehicle x-y coordinate system |
| $y_2$ | Lateral axis of trailer x-y coordinate system |
| $L_1$ | Vehicle wheel base |
| $L_2$ | Trailer tongue length |
| T | Vehicle and trailer track width |
| h | Longitudinal distance between hitch and rear axle |
| $u_1$ | Vehicle traveling speed |

Figure 2:
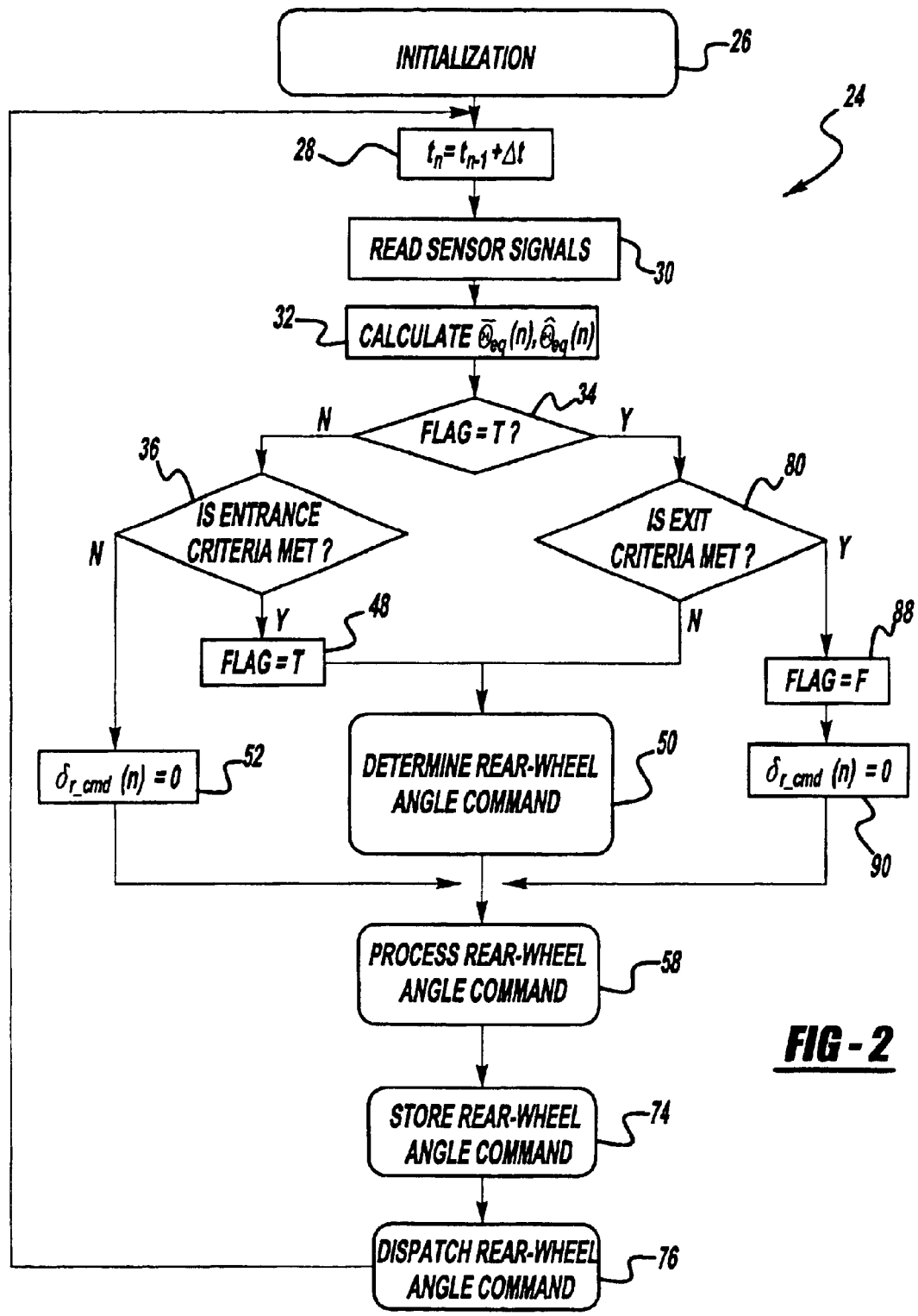
FIG. 2 is a flow chart diagram showing steps in the algorithm of the invention that selectively assists a vehicle operator during a back-up maneuver to prevent a vehicle-trailer from jackknifing.

FIG. 2 is a flow chart diagram 24 showing the steps in an algorithm of the invention for selectively assisting a vehicle operator performing a back-up maneuver with a vehicle-trailer by providing automatic rear-wheel steering in the event of a potential jackknife condition. The algorithm initializes the system at box 26 by resetting a control clock to $t_0=0$, setting a control flag Flag=F(false) and setting a current rear-wheel steering angle command $\delta_{r\_cmd}$ and a previous rear-wheel steering angle command $\bar{\delta}_{r\_cmd}$ to zero. The control flag indicates whether rear-wheel steering is currently being provided to assist the vehicle operator and the rear-wheel steering angle command identifies the degree that the rear-wheels are being turned. The initialization process is in response to certain initialization procedures, including determining whether the vehicle is in reverse, sensing whether the trailer 16 has been coupled to the hitch 18, switching a button on the dashboard to enable the system, etc. The algorithm then increments the clock $t_n$ to $t_{n-1}+\Delta t$ at box 28.

The algorithm reads sensor input signals of the steering wheel angle $\delta_{sw}(n)$, the rearward vehicle speed $\mu_1(n)$ and the hitch angle $\theta(n)$ to calculate the equilibrium hitch angle $\bar{\theta}_{eq}(n)$ and the pseudo-equilibrium hitch angle $\hat{\theta}_{eq}(n)$ at box 32. The equilibrium hitch angle $\bar{\theta}_{eq}(n)$ is calculated by:

$$\bar{\theta}_{eq} = \tan^{-1}\left(\frac{y}{x}\right) = f(\delta_f, \delta_r, \Gamma), \quad (1)$$

where $$\delta_r = 0,$$

$$x = h - \frac{L_1 \tan\delta_r}{\tan\delta_f - \tan\delta_r},$$

$$y = \frac{YL_2 x}{Y^2 - x^2} + \frac{x^2}{Y^2 - x^2}\sqrt{Y^2 + L_2^2 - x^2}, \text{ and}$$

$$Y = \sqrt{\left(\frac{L_1}{\tan\delta_f - \tan\delta_r} + \frac{T}{2}\right)^2 + \left(h - \frac{L_1 \tan\delta_r}{\tan\delta_f - \tan\delta_r}\right)^2 - L_2^2}$$

$$\delta_f = \frac{\delta_{sw}}{r_{gearratio}}$$

is the front-wheel angle, $\delta_r$ is the rear-wheel angle, $r_{gearratio}$ is the gear ratio in the front steering system, and $\Gamma$ represents the dynamic and kinematical parameters of the vehicle-trailer combination.

It is noted that this model is based on a slow motion assumption with kinematics only taken into consideration. Also, it is assumed that the roll and pitch motion of the vehicle is small and is neglected, and the tire slip is negligible during the vehicle-trailer back-up maneuver.

For a vehicle-trailer, there is only one equilibrium hitch angle $\bar{\theta}_{eq}(n)$ regardless of whether the vehicle-trailer is moving forward or backward. However, during back-up maneuvers, it is possible that the system may never reach steady state before a jackknife condition occurs. Therefore, the present invention calculates the pseudo-equilibrium hitch angle $\hat{\theta}_{eq}(n)$, which is a steady-state hitch angle when the rear-wheel steering angle reaches its maximum value $\bar{\delta}_{r\_max}$, for example, ±12°. The pseudo-equilibrium hitch angle $\hat{\theta}_{eq}(n)$ is used in combination with equilibrium hitch angle $\bar{\theta}_{eq}(n)$ to determine a control activation region, that is, a region that determines when and how the controller provides rear-wheel steering. The pseudo-equilibrium hitch angle $\hat{\theta}_{eq}(n)$ is calculated by:

$$\hat{\theta}_{eq}(n) = \tan^{-1}\left(\frac{y}{x}\right) = f(\delta_f, \delta_r, \Gamma) \quad (2)$$

But, $$\delta_r = \bar{\delta}_{r\_max} \quad \text{if } \delta_f > 0,$$

$$\delta_r = -\bar{\delta}_{r\_max} \quad \text{if } \delta_f < 0$$

From equation (2), the pseudo-equilibrium hitch angle varies as the driver's steering changes, and has two values corresponding to $\bar{\delta}_{r\_max}=-12°$ and 12°, respectively. Thus, by properly controlling the rear wheel steering within its limit, the hitch angle $\theta(n)$ can be changed accordingly within the range set by the two equilibrium hitch angles $\bar{\theta}_{eq}(n)$ and $\hat{\theta}_{eq}(n)$. As a result, the vehicle-trailer system can be stabilized as the hitch angle $\theta(n)$ is directed towards its equilibrium point.

The anti-jackknifing control is activated only when necessary and possible. Therefore, for a given front steering angle $\delta_f(n)>0$, the pseudo-equilibrium hitch angle $\hat{\theta}_{eq}$ is determined by equation (2) at $\bar{\delta}_{r\_max}=-12°$. Similarly, for a given front steering angle $\delta_f(n)<0$, the pseudo-equilibrium hitch angle $\hat{\theta}_{eq}$ is determined by equation (2) at $\bar{\theta}_{r\_max}=12°$. Thus, the controllable range in terms of the hitch angle $\theta(n)$ is set by pseudo-equilibrium hitch angle $\hat{\theta}_{eq}$ and the equilibrium hitch angle $\bar{\theta}_{eq}$, which also sets up the entrance criteria.

Once the equilibrium hitch angle $\bar{\theta}_{eq}(n)$ and the pseudo-equilibrium hitch angle $\hat{\theta}_{eq}(n)$ are calculated, the algorithm determines whether the control flag has been set to true (T) at decision diamond 34. If the control flag is false (F), the system is currently not assisting the driver with rear-wheel steering and if the control flag is true (T), the system is currently providing rear-wheel steering assistance.

If the control flag has not been set to true (T), then the algorithm determines if predetermined entrance criteria have been met to provide the automatic rear-wheel steering assist at decision diamond 36. In other words, the system determines if it should be providing rear-wheel steering assistance to prevent a jackknife condition. As discussed above, the system does not assist the vehicle operator with the back-up maneuver unless certain criteria are met so that the automatic rear-wheel steering control is activated only when necessary, so as to minimize rear-wheel steering interference with the vehicle operator.

Figure 3:
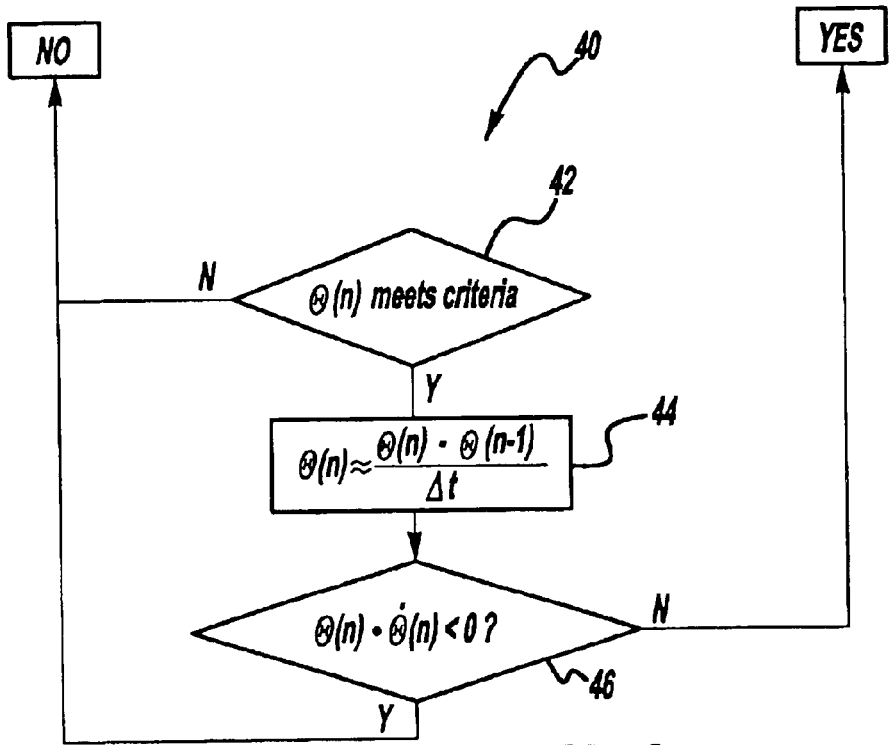
FIG. 3 is a flow chart diagram showing steps in the algorithm of the invention for determining if entrance criteria are met to provide the driver assist in one of the steps of the flow chart diagram shown in FIG. 2.

FIG. 3 is a flow chart diagram 40 showing the steps that the algorithm performs within the step of the decision diamond 36. Decision diamond 42 provides a position check to determine if the measured hitch angle $\theta(n)$ is within the range set by the equilibrium hitch angle $\bar{\theta}_{eq}(n)$ and the pseudo-equilibrium hitch angle $\hat{\theta}_{eq}(n)$ by the following equations.

If, $\delta_f(n)>0$ then, $$\theta(n)-\bar{\theta}_{eq}(n)>\kappa_1 \text{ and } \theta(n)-\hat{\theta}_{eq}(n)<\kappa_2$$

or,

If, $\theta_f(n)<0$ then, $$\theta(n)-\bar{\theta}_{eq}(n)<\kappa_3 \text{ and } \theta(n)-\hat{\theta}_{eq}(n)>\kappa_4 \quad (3)$$

$\kappa_i$ are predetermined positive constants for calibration.

In equation (3), the algorithm determines whether the measured hitch angle $\theta(n)$ is greater than the equilibrium hitch angle $\bar{\theta}_{eq}(n)$, and if so, by how much, and whether the measured hitch angle $\theta(n)$ is near the pseudo-equilibrium hitch angle $\hat{\theta}_{eq}(n)$, depending on the orientation $\delta_f$ of the front wheels of the vehicle. In other words, the system provides rear-wheel steering assist only when the measured hitch angle $\theta(n)$ falls into the range set by the equilibrium hitch angle $\bar{\theta}_{eq}(n)$ and pseudo-equilibrium hitch angle $\hat{\theta}_{eq}(n)$ as defined in equation (3). The constants $\kappa_1$ provide these values for calibration purpose.

If the algorithm determines that, for example, when $\delta_f(n)>0$, the measured hitch angle $\theta(n)$ is greater than the equilibrium hitch angle $\bar{\theta}_{eq}(n)$ and less than the pseudo-equilibrium hitch angle $\hat{\theta}_{eq}(n)$ by the predetermined $\kappa_1$ values, then the algorithm determines the rate that the hitch angle $\theta(n)$ is converging or diverging relative to the equilibrium hitch angle $\bar{\theta}_{eq}(n)$ at box 44. In other words, the algorithm determines how fast the hitch angle is changing by:

$$\dot{\theta}(n) = \frac{d\theta}{dt} \approx \frac{\theta(n)-\theta(n-1)}{\Delta t} \quad (4)$$

The sign of the hitch angle rate $\dot{\theta}(n)$ determines which direction the hitch angle $\theta(n)$ is moving. The algorithm then uses the hitch angle rate $\dot{\theta}(n)$ at decision diamond 46 to determine the convergence or divergence of the hitch angle $\theta(n)$ by:

if, $\theta(n)>0$, then $$\dot{\theta}(n)<0$$

or,

If, $\theta(n)<0$, then $$\dot{\theta}(n)>0 \quad (5)$$

The step of the decision diamond 46 multiplies the measured hitch angle $\theta(n)$ by the hitch angle rate $\dot{\theta}(n)$ to determine whether a positive hitch angle $\theta(n)$ is moving to decrease its value or a negative hitch angle $\theta(n)$ is moving to increase its value. If this is true, then the measured hitch angle $\theta(n)$ is converging towards the equilibrium position, the output of the decision diamond 46 is yes, and rear-wheel steering assist is not required. Otherwise, the output of the decision diamond 46 is no, and the entrance criteria are met.

If the entrance criteria are met, the output of the decision diamond 46 is yes, and the control flag is set to true (T) at box 48. The algorithm then determines the appropriate rear-wheel steering angle command $\delta_{r\_cmd}$ at box 50 that will assist the vehicle operator to prevent the vehicle-trailer from jackknifing. In one embodiment, the rear-wheel steering angle command $\delta_{r\_cmd}$ is determined by a PD controller as:

$$\delta_{r\_cmd}=-(K_p+K_d s)\theta(n) \quad (6)$$

$K_p$ and $K_d$ are proportional and derivative gains, respectively, and are functions of the vehicle speed $\mu_1(n)$.

If the algorithm determines that, for example, when $\delta_f(n)>0$, the measured hitch angle $\theta(n)$ is not greater than the equilibrium hitch angle $\bar{\theta}_{eq}(n)$, or not less than the pseudo-equilibrium hitch angle $\hat{\theta}_{eq}(n)$, by the predetermined $\kappa_i$ values at the decision diamond 42, or the measured hitch angle is converging towards the equilibrium position at the decision diamond 46, the output of the decision diamond 36 is no, and the rear-wheel steering angle command is set to zero ($\delta_{r\_cmd}(n)=0$) at box 52.

Figure 4:
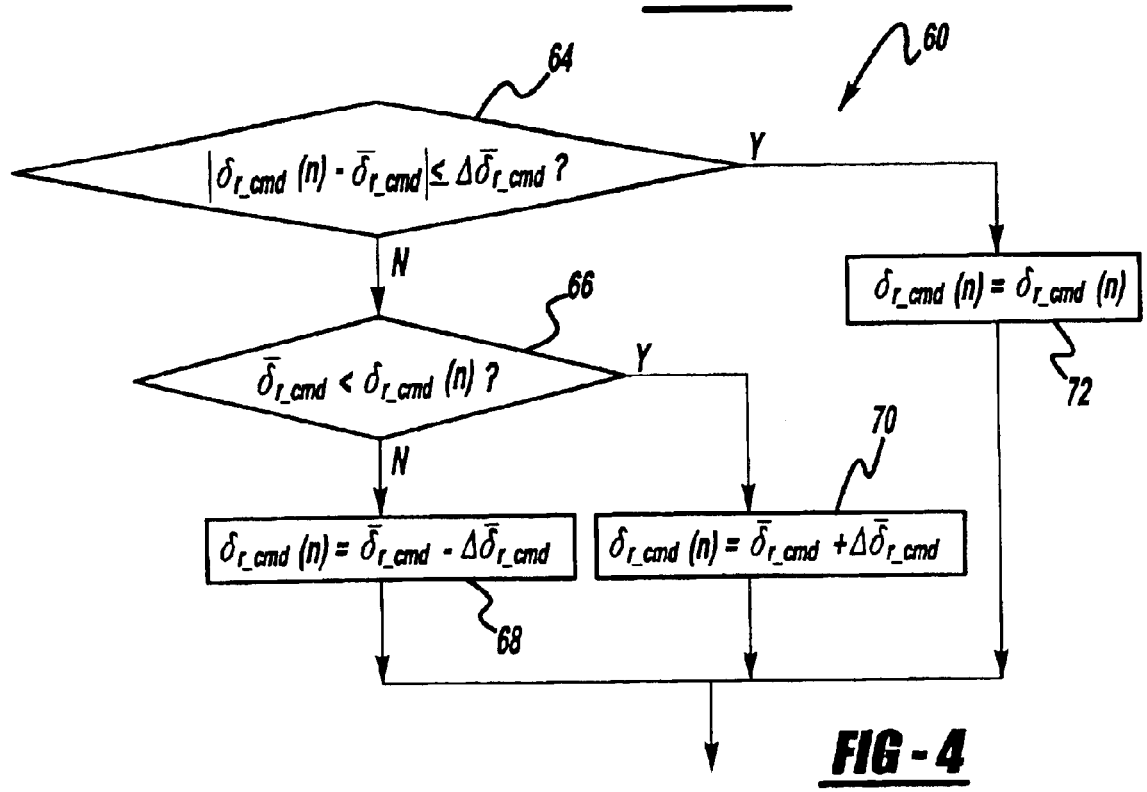
FIG. 4 is a flow chart diagram showing steps in the algorithm of the invention for processing a rear-wheel angle command in one of the steps of the flow chart diagram shown in FIG. 2.

The algorithm, at box 58, processes the rear-wheel steering angle command $\delta_{r\_cmd}$ determined at the box 50 or the box 52 to provide a smooth control input to the rear-wheel actuator that steers the rear-wheels. FIG. 4 is a flow chart diagram 60 showing the operation of this process at the box 58. Decision diamond 64 determines the absolute value of the difference between the just determined (current) rear-wheel steering angle command $\delta_{r\_cmd}(n)$ and a previously stored rear-wheel steering angle command $\bar{\delta}_{r\_cmd}$ as:

$$|\delta_{r\_cmd}(n)-\bar{\delta}_{r\_cmd}(n)|\leq\Delta\bar{\delta}_{r\_cmd} \quad (7)$$

$\Delta\bar{\delta}_{r\_cmd}$ is a predetermined value. If the difference between the two commands determined at the decision diamond 64 is greater than $\Delta\bar{\delta}_{r\_cmd}$, then the current rear-wheel command $\delta_{r\_cmd}$, is reduced so that the change to the rear-wheel steering angle command is not too large.

Decision diamond 66 determines whether the current rear-wheel command $\delta_{r\_cmd}$ is less than or greater than the previous rear-wheel command $\overline{\delta}_{r\_cmd}$. If the current rear-wheel command $\delta_{r\_cmd}$ is less than the previous rear-wheel command $\overline{\delta}_{r\_cmd}$, the current rear-wheel command $\delta_{r\_cmd}$ is set at box 68 to be the previous rear-wheel command $\overline{\delta}_{r\_cmd}$ minus the predetermined value $\Delta\overline{\delta}_{r\_cmd}$ by:

$$\delta_{r\_cmd}(n) = \overline{\delta}_{r\_cmd} - \Delta\overline{\delta}_{r\_cmd} \quad (8)$$

If the current rear-wheel command $\delta_{r\_cmd}$ is greater than the previous rear-wheel command $\overline{\delta}_{r\_cmd}$, the current rear-wheel command $\delta_{r\_cmd}$ is set at box 70 to be the previous rear-wheel command $\overline{\delta}_{r\_cmd}$ plus the predetermined value $\Delta\overline{\delta}_{r\_cmd}$ by:

$$\delta_{r\_cmd}(n) = \overline{\delta}_{r\_cmd} + \Delta\overline{\delta}_{r\_cmd} \quad (9)$$

If the difference between the two commands determined at the decision diamond 64 is less than $\Delta\overline{\delta}_{r\_cmd}$, then the current rear-wheel command $\delta_{r\_cmd}$ is set to be the current rear-wheel angle command $\delta_{r\_cmd}(n)$ at box 72. The process in the box 58 insures that changes to the rear-wheel steering angle are small enough so as to not significantly interfere with the driver steering.

Returning to the flow chart diagram 24, the current rear-wheel command $\delta_{r\_cmd}$ is then stored in a preset memory at box 74 to be the previous rear-wheel command $\overline{\delta}_{r\_cmd}$ for the next computational period as:

$$\overline{\delta}_{r\_cmd}(n) = \delta_{r\_cmd}(n) \quad (10)$$

The current rear-wheel command $\delta_{r\_cmd}$ is then sent to the rear-wheel steering actuator at box 76 to steer the rear-wheels 14 and provide the desired steering assist. The algorithm then returns to the box 28 to update the timer.

Figure 5:
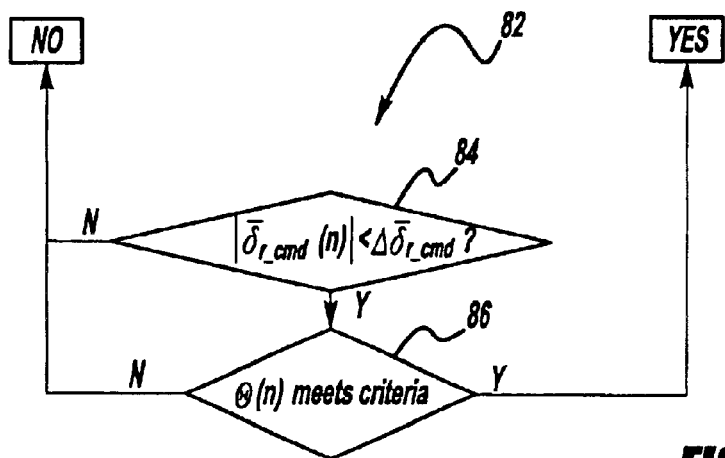
FIG. 5 is a flow chart diagram showing steps in the algorithm of the invention for determining if exit criteria are met to remove the driver assist in one of the steps of the flow chart diagram shown in FIG. 2.

If the control flag is set to true (T) at the box 48, the output of the decision diamond 34 is yes. The algorithm then determines whether predetermined exit criteria are met at decision diamond 80 to remove the rear-wheel steering angle command, if applicable. FIG. 5 is a flow chart diagram 82 that shows how the algorithm determines if the exit criteria are met in the step of the decision diamond 80. Decision diamond 84 first determines if the absolute value of the previously stored rear-wheel angle command $\overline{\delta}_{r\_cmd}$ is small enough, such as less than a predetermined value $\Delta\overline{\delta}_{r\_cmd}$ as:

$$|\overline{\delta}_{r\_cmd}(n)| \leq \Delta\overline{\delta}_{r\_cmd} \quad (11)$$

If the absolute value of the previously stored rear-wheel angle command $\overline{\delta}_{r\_cmd}$ is not less than $\Delta\overline{\delta}_{r\_cmd}$, rear-wheel steering assist is currently active, and the output of the decision diamond 80 is no. The algorithm proceeds to determine the rear-wheel steering angle command $\delta_{r\_cmd}$ at the box 50. If the absolute value of the previously stored rear-wheel angle command $\overline{\delta}_{r\_cmd}$ less than $\Delta\overline{\delta}_{r\_cmd}$, the hitch angle position is determined at decision diamond 86 to determine whether the exit criteria are met as:

If, $\delta_f(n) > 0$, then $$\theta(n) - \overline{\theta}_{eq}(n) > \kappa_5 \text{ and } \theta(n) - \hat{\theta}_{eq}(n) < \kappa_6$$

or,

If $\theta_f(n) < 0$, then $$\theta(n) - \overline{\theta}_{eq}(n) < \kappa_7 \text{ and } \theta(n) - \hat{\theta}_{eq}(n) > \kappa_8 \quad (12)$$

$\kappa_1$ are predetermined positive constants for calibration. The exit condition criteria parallel the entrance criteria of equation (3).

If the hitch angle position does not meet the exit criteria of equation (12) at the decision diamond 86, then the algorithm again proceeds to determine the current rear-wheel angle command $\delta_{r\_cmd}$ at the box 50. If the hitch angle position does meet the exit criteria of equation (12), then the output of the decision diamond 80 is yes, and the control flag is set to false (F) at box 88. The algorithm then sets the rear-wheel steering angle command $\delta_{r\_cmd}$ to zero at box 90, and proceeds to process that command at the box 58 so that the rear-wheel steering assist is removed.

Figure 6A:
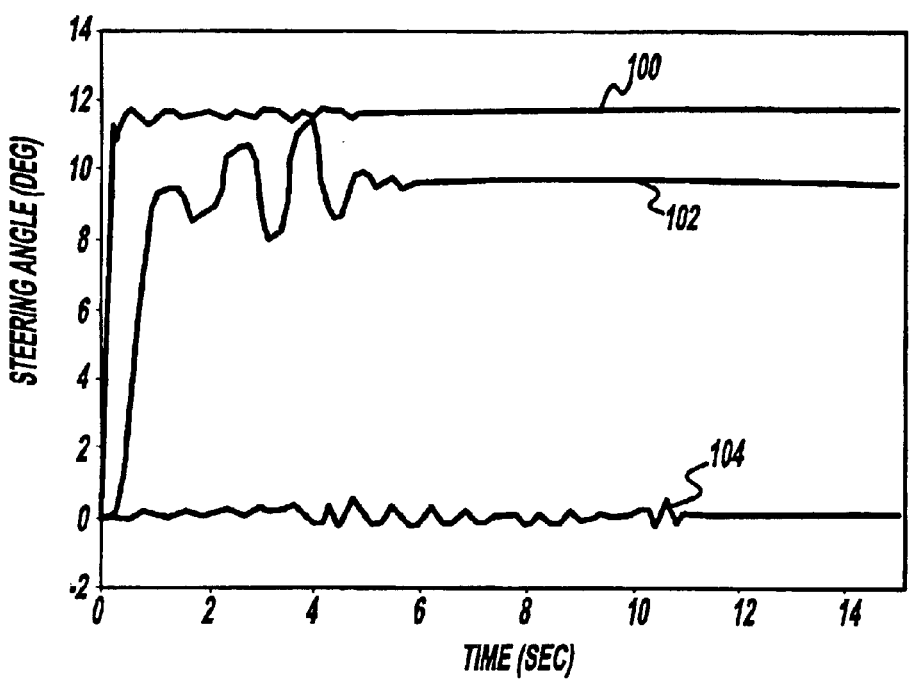
FIGS. 6(a) and 6(b) are graphs showing simulation results with and without the rear-wheel steering control of the invention.
Figure 6B:
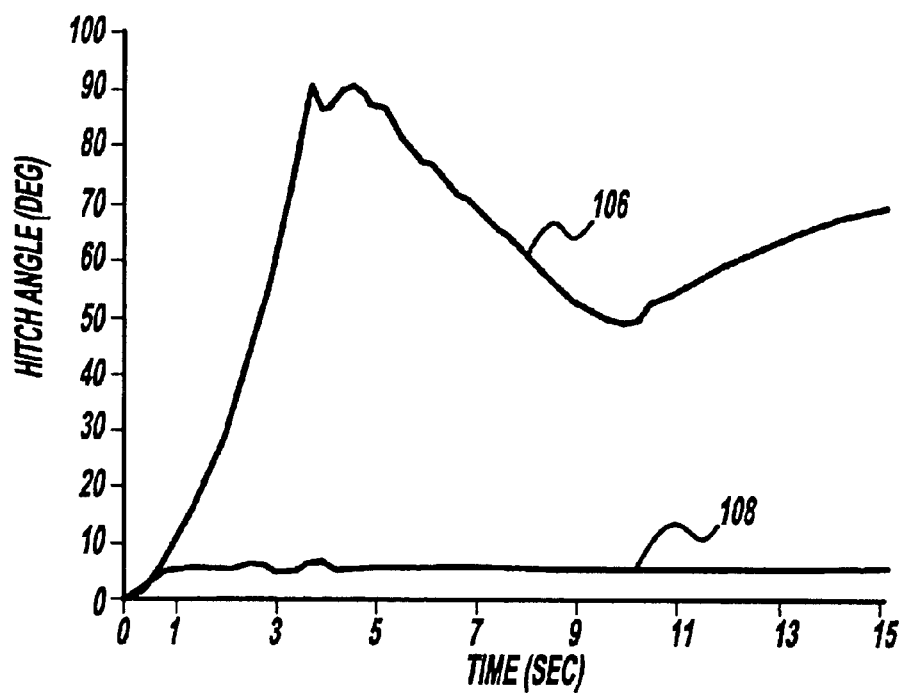

FIG. 6(a) is a graph with time on the horizontal axis and steering angle on the vertical axis and FIG. 6(b) is a graph with time on the horizontal axis and hitch angle on the vertical axis that show the results of a simulation for the system of the invention described above. In this simulation, a steering back-up maneuver at 10 KPH under dry surface conditions was performed. In FIG. 6(a), graph line 100 is the front-wheel steering angle, graph line 102 is the rear-wheel steering angle with control and graph line 104 is the rear-wheel steering angle without control. In FIG. 6(b), graph line 108 shows that the hitch angle approaches and then stays stable at its equilibrium point with rear-wheel steering control. Graph line 106 shows that the hitch angle diverges from its equilibrium point without rear-wheel steering control, which eventually leads to a jackknife condition.

The foregoing discussion discloses and describes merely exemplary embodiments of the present invention. One skilled in the art will readily recognize from such discussion and from the accompanying drawings and claims, that various changes, modifications and variations can be made therein without departing from the spirit and scope of the invention as defined in the following claims.

What is claimed is:

1. A method for selectively providing rear-wheel steering for a vehicle backing-up a trailer, said method comprising:
   determining a steering angle of the vehicle;
   determining a speed of the vehicle;
   determining a measured hitch angle between the vehicle and the trailer;
   calculating an equilibrium hitch angle between the vehicle and the trailer that is a steady-state hitch angle position;
   calculating a pseudo-equilibrium hitch angle between the vehicle and the trailer that is a steady-state hitch angle position at a maximum rear-wheel steering input;
   determining whether a predetermined relationship exists between the measured hitch angle, the equilibrium hitch angle and the pseudo-equilibrium hitch angle; and
   providing the rear-wheel steering of the vehicle if the predetermined relationship does exist.

2. The method according to claim 1 wherein determining whether the predetermined relationship exists includes determining how close the measured hitch angle is to the equilibrium hitch angle and the pseudo-equilibrium hitch angle, determining a rate of change of the measured hitch angle, and determining whether the measured hitch angle is converging towards or away from the equilibrium hitch angle and the pseudo-equilibrium hitch angle.

3. The method according to claim 2 wherein determining whether the predetermined relationship exists includes determining the orientation of the steering angle of the vehicle and determining whether the measured hitch angle is within a range set by the equilibrium hitch angle and the pseudo-equilibrium hitch angle by a predetermined amount.

4. The method according to claim 1 wherein calculating the equilibrium hitch angle includes calculating the equilibrium hitch angle as:

$$\bar{\theta}_{eq} = \tan^{-1}\left(\frac{y}{x}\right)$$

where, $$x = h - \frac{L_1 \tan\delta_r}{\tan\delta_f - \tan\delta_r},$$

$$y = \frac{YL_2 x}{Y^2 - x^2} + \frac{x^2}{Y^2 - x^2}\sqrt{Y^2 + L_2^2 - x^2}, \text{ and}$$

$$Y = \sqrt{\left(\frac{L_1}{\tan\delta_f - \tan\delta_r} + \frac{T}{2}\right)^2 + \left(h - \frac{L_1 \tan\delta_r}{\tan\delta_f - \tan\delta_r}\right)^2 - L_2^2}.$$

5. The method according to claim 1 further comprising removing the rear-wheel steering if the predetermined relationship does not exist when the rear-wheel steering is being provided.

6. The method according to claim 5 wherein removing the rear-wheel steering includes determining the difference between a current rear-wheel angle command and a previously stored rear-wheel angle command and removing the rear-wheel steering if the difference is less than a predetermined value.

7. The method according to claim 5 wherein removing the rear-wheel steering includes determining how close the measured hitch angle is to the equilibrium hitch angle and the pseudo-equilibrium hitch angle.

8. The method according to claim 7 wherein removing the rear-wheel steering includes determining the orientation of the steering angle of the vehicle and determining whether the measured hitch angle is within a range set by the equilibrium hitch angle and the pseudo-equilibrium hitch angle by a predetermined amount.

9. The method according to claim 1 wherein providing the rear-wheel steering includes providing proportional and derivative control of the rear-wheels of the vehicle.

10. The method according to claim 1 wherein providing the rear-wheel steering includes calculating a current rear-wheel angle command and determining whether the current rear-wheel angle command is less than a previous rear-wheel angle command by a predetermined amount.

11. The method according to claim 10 wherein providing the rear-wheel steering includes providing the current rear-wheel angle command if the current rear-wheel angle command is less than the predetermined amount.

12. The method according to claim 10 wherein providing the rear-wheel steering includes setting the current rear-wheel angle command to the predetermined amount if the current rear-wheel angle command is greater than the predetermined amount.

13. A method of selectively providing rear-wheel steering for a vehicle backing-up a trailer, said method comprising:
determining a steering angle of the vehicle;
determining a speed of the vehicle;
determining a measured hitch angle between the vehicle and the trailer;
calculating an equilibrium hitch angle between the vehicle and the trailer that is a steady-state hitch angle position;
calculating a pseudo-equilibrium hitch angle between the vehicle and the trailer that is a steady-state hitch angle position at a maximum rear-wheel steering input;
determining whether a predetermined relationship exists between the measured hitch angle, the equilibrium hitch angle and the pseudo-equilibrium hitch angle, wherein the predetermined relationship includes determining the orientation of the steering angle of the vehicle, determining whether the measured hitch angle is within a range set by the equilibrium hitch angle and the pseudo-equilibrium hitch angle, determining a rate of change of the measured hitch angle and determining whether the measured hitch angle is converging towards or away from the equilibrium hitch angle and the pseudo-equilibrium hitch angle;
providing rear-wheel steering of the vehicle if the predetermined relationship does exist; and
removing the rear-wheel steering if the predetermined relationship no longer exists when the rear-wheel steering is being provided.

14. The method according to claim 13 wherein removing the rear-wheel steering includes determining the difference between a current rear-wheel angle command and a previously stored rear-wheel angle command and removing the rear-wheel steering if the difference is less than a predetermined value.

15. The method according to claim 13 wherein removing the rear-wheel steering includes determining how close the measured hitch angle is to the equilibrium hitch angle and the pseudo-equilibrium hitch angle.

16. The method according to claim 15 wherein removing the rear-wheel steering includes determining the orientation of the steering angle of the vehicle and determining whether the measured hitch angle is within the range set by the equilibrium hitch angle and the pseudo-equilibrium hitch angle by a predetermined amount.

17. The method according to claim 13 wherein providing the rear-wheel steering includes providing proportional and derivative control of the rear-wheels of the vehicle.

18. The method according to claim 13 wherein providing the rear-wheel steering includes calculating a current rear-wheel angle command and determining whether the current rear-wheel angle command is less than a previous rear-wheel angle command by a predetermined amount.

19. The method according to claim 18 wherein providing the rear-wheel steering includes providing the current rear-wheel angle command if the current rear-wheel angle command is less than the predetermined amount.

20. The method according to claim 18 wherein providing the rear-wheel steering includes setting the current rear-wheel angle command to the predetermined amount if the current rear-wheel angle command is greater than the predetermined amount.

21. The method according to claim 13 wherein calculating the equilibrium hitch angle includes calculating the equilibrium hitch angle as:

$$\bar{\theta}_{eq} = \tan^{-1}\left(\frac{y}{x}\right)$$

where, $$x = h - \frac{L_1 \tan\delta_r}{\tan\delta_f - \tan\delta_r},$$

$$y = \frac{YL_2 x}{Y^2 - x^2} + \frac{x^2}{Y^2 - x^2}\sqrt{Y^2 + L_2^2 - x^2}, \text{ and}$$

$$Y = \sqrt{\left(\frac{L_1}{\tan\delta_f - \tan\delta_r} + \frac{T}{2}\right)^2 + \left(h - \frac{L_1 \tan\delta_r}{\tan\delta_f - \tan\delta_r}\right)^2 - L_2^2}.$$

22. A system for selectively providing rear-wheel steering for a vehicle backing-up a trailer, said system comprising:

a steering angle sensor for determining a steering angle of the vehicle;

a speed sensor for determining a speed of the vehicle;

a hitch angle sensor for measuring a hitch angle between the vehicle and the trailer; and a controller for selectively providing the rear-wheel steering to the vehicle if a jackknife condition is probable, said controller calculating an equilibrium hitch angle between the vehicle and the trailer that is a steady-state hitch angle position, calculating a pseudo-equilibrium hitch angle between the vehicle and the trailer that is a steady-state hitch angle position at a maximum rear-wheel steering input, determining whether a predetermined relationship exists between the measured hitch angle, the equilibrium hitch angle and the pseudo-equilibrium hitch angle, and providing the rear-wheel steering to the vehicle if the predetermined relationship does exist.

23. The system according to claim 22 wherein the controller determines how close the measured hitch angle is to the equilibrium hitch angle and the pseudo-equilibrium hitch angle, determines a rate of change of the measured hitch angle, and determines whether the measured hitch angle is converging towards or away from the equilibrium hitch angle and the pseudo-equilibrium hitch angle to determine whether the predetermined relationship exists.

24. The system according to claim 23 wherein the controller determines the orientation of the steering angle of the vehicle and whether the measured hitch angle is within a range set by the equilibrium hitch angle and the pseudo-equilibrium hitch angle by a predetermined amount to determine if the predetermined relationship exists.

25. The system according to claim 22 wherein the controller removes the rear-wheel steering if the predetermined relationship does not exist when the rear-wheel steering is being provided.

26. The system according to claim 25 wherein the controller determines the difference between a current rear-wheel angle command and a previously stored rear-wheel angle command and removes the rear-wheel steering if the difference is less than a predetermined value.

27. The system according to claim 26 wherein the controller determines how close the measured hitch angle is to the equilibrium hitch angle and the pseudo-equilibrium hitch angle when it determines that the predetermined relationship does not exist.

28. The system according to claim 27 wherein the controller determines the orientation of the steering angle of the vehicle and whether the measured hitch angle is greater than the equilibrium hitch angle and close to the pseudo-equilibrium hitch angle by a predetermined amount when it determines that the predetermined relationship does not exist.

29. The system according to claim 22 wherein the controller provides proportional and derivative control of the rear-wheels of the vehicle.

30. The system according to claim 22 wherein the controller calculates a current rear-wheel command and determines whether the current rear-wheel command is less than a previous rear-wheel angle command by a predetermined amount.

31. The system according to claim 30 wherein the controller sets the rear-wheel steering to the current rear-wheel command if the current rear-wheel command is less than the predetermined amount.

32. The system according to claim 30 wherein the controller decreases the current rear-wheel command the predetermined amount if the current rear-wheel angle command is greater than the predetermined amount.

* * * * *